2 Sheets—Sheet 1.
S. A. BEMIS.
CAR AXLE BOX.
No. 10,081. Reissued Apr. 11, 1882.
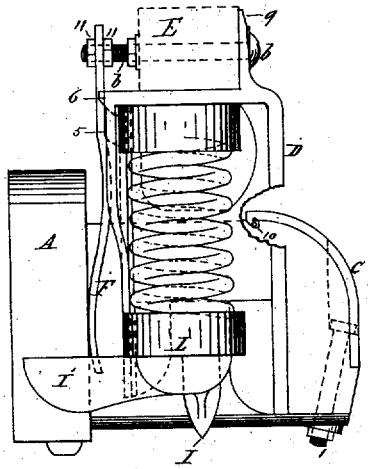
Fig. I
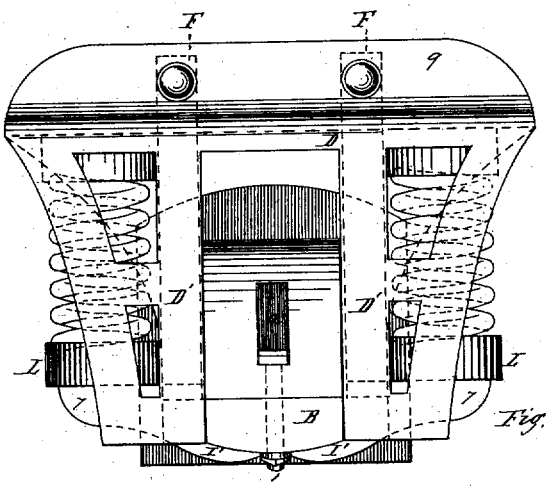
Fig. II
Witnesses.
E. M. Bissell.
Chas. H. Wood.
Inventor.
Sumner A. Bemis.
By T. A. Curtis.
his atty.
N. PETERS, Photo-Lithographer, Washington, D. C.

2 Sheets—Sheet 2.
S. A. BEMIS.
CAR AXLE BOX.
No. 10,081. Reissued Apr. 11, 1882.
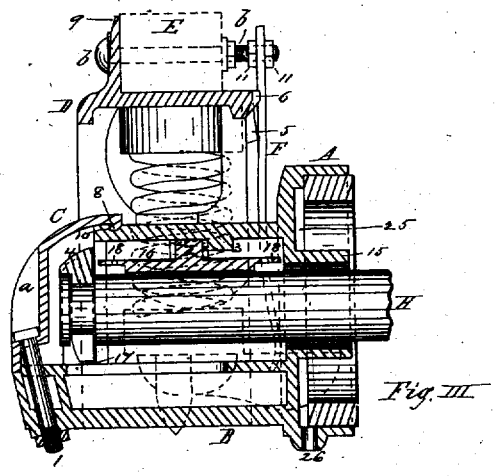
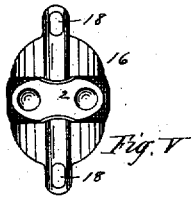
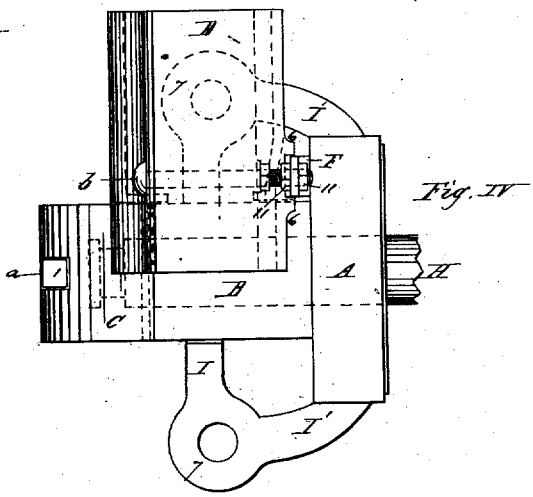
Witnesses.
E. M. Bissell.
Chas. H. Wood.
Inventor.
Summer A. Bemis.
By T. A. Curtis,
his atty.
N. PETERS, Photo-Lithographer, Washington, D. C.

UNITED STATES PATENT OFFICE.

SUMNER A. BEMIS, OF SPRINGFIELD, MASSACHUSETTS.

CAR-AXLE BOX.

SPECIFICATION forming part of Reissued Letters Patent No. 10,081, dated April 11, 1882.

Original No. 239,018, dated March 22, 1881. Application for reissue filed October 18, 1881. Patented in England August 12, 1880, in Belgium August 31, 1880, and in France September 22, 1880.

*To all whom it may concern:*

Be it known that I, SUMNER A. BEMIS, of Springfield, in the county of Hampden and State of Massachusetts, have invented a new and useful Improvement in Axle-Boxes for Railway-Cars, of which the following is a specification.

The object of my invention is to provide a car-axle box which is convenient of access, uniform and even in the bearing and wear of its movable parts, strong and durable, and which shall permit an easy motion of the car-body with which it it connected; and I accomplish these objects by the mechanism shown in the accompanying drawings, which is an improvement upon the patent granted to me September 4, 1877, No. 194,801.

Figure I is a side view of a car-axle box having my invention applied. Fig. II is an end view of the same. Fig. III is a vertical longitudinal section at the axis of the axle. Fig. IV is a half-plan view of the pedestal and box together and a half-plan view of the box alone; and Fig. V is a plan view of the brass which takes the bearing of the axle.

In the drawings, B represents the box proper, or that portion which is adapted to receive the oil, and in which are located the bearing portions of the axle, and upon the lower side of the upper portion of which is cast a lug, as 3, (shown in Fig. III,) which lug projects down by the side of the stud, as 2, on the brass 16, to stop the latter from moving inward out of its proper position, the key, as 4, at the outer end of the axle preventing the brass from moving outward, and this forked key, as 4, which is movable in vertical grooves, as 17, in the sides of the box, also straddles the grooved outer end of the axle and keeps the latter in its proper relative position with and in the box.

The cap C is provided at its upper end with a projection on the inside, which is inserted into a corresponding recess in the upper side of the box, near its outer end; and the cap is provided with a recess, as *a*, with a hole in the bottom to receive a bolt, as 1, inserted down through the outer end of the box, with a nut turned on the lower end, which secures the cap in place upon the box. When made rectangular in its cross-section, with a rectangular head upon the bolt, as shown clearly in Figs. III and IV, the recess will hold the bolt stationary and firmly while the nut is being turned on its lower end, and the end of the box is then free from projections.

The pedestal, as D, is secured to the sill, as E, (shown in dotted lines,) of the car by bolts, as *b*, and is provided with jaws, as D′, which extend down over each side of the box B, and a spring, as F, is secured to the inner end of each bolt, as *b*, by check-nuts, as 11, and extends down on each side of the box, with its lower end arranged to bear against the housing, as A, and its upper part to bear against a lug, as 5, cast on the inside of the upper part of the pedestal, and the spring is prevented from vibrating in one direction—that is, in a direction lengthwise the car—by the lugs or projections, as 6, on the pedestal. This spring may be adjusted to bear more or less against the housing A by turning the nuts, as 11, more or less onto the bolts *b*.

The steps, as 7, one on each side of the box to support the spring, are each secured by two braces, one, as at I, extending from the step to the box, and the other, as at I′, extending from the step to the housing A, which construction renders the whole much stronger and much more rigid.

The brass 16, which sustains the bearing of the axle H, is made with both ends alike, so that the brass may be inserted either end first, and its ends are elongated, with a hole, as 18, in each, if desirable, by which to draw the brass out of the box conveniently with a hook when the cap C is removed for that purpose.

A space, as 25, is left between the inner portion of the housing and the packing in the outer portion, with a drainage-hole, 26, through the bottom of the housing, all shown clearly in Fig. III, into which space any liquid—such as surplus oil from the bearing, which might work toward the wheel, or water in rainy weather, which might collect in the housing—may drain off, instead of collecting on the outside of the box or the wheel, which is often the case without this provision being made for its escape.

Having thus described my invention, what I claim as new is—

1. The combination of the axle, having no brass-retaining collar of greater diameter than its bearing-surface, with the box adapted to contain the axle and its bearings, provided with a single lug, as 3, projecting down inside, and a movable brass provided with a single stud, as 2, projecting upward in a position to bear against said lug, substantially as and for the purpose set forth.

2. The combination, in an axle-box for cars, of the box adapted to contain the axle, the housing for the same at the inner end of the box, a step on each side of the box to support the car-spring, and two braces extending in different directions from each step, one to the box and the other to the housing, and made solid therewith, substantially as described.

3. In a car-axle box, the combination of the spring F, with retaining-nuts, as 11, the pedestal provided with lugs, as 6, to prevent side vibration of the spring, the lug, as 5, as a bearing for said spring, and the box with its housing for containing the axle, substantially as described.

4. In a car-axle box, the reversible brass provided with a single stud, as 2, to operate in connection with a single lug, as 3, projecting down from the axle-box above and formed with elongated ends, substantially as and for the purpose set forth.

5. In an improved car-axle box, the combination of the removable brass, adapted to be moved longitudinally in the box between the journal and the upper side of the box, the box adapted to contain the axle-journal, and whose bearing for the brass on the inner surface of the upper side of the box is made on a horizontal plane extending to the outer end, the journal provided with a circumferential groove near its outer end, and a retaining-key adapted to be held in place by retaining ribs or shoulders on the interior of the box, and to engage in said groove in the journal, and extending upward in front of the brass, whereby the said brass may be easily withdrawn from its position between the journal and the upper side of the box by a horizontal movement without a vertical movement of the box, and is also prevented from any accidental horizontal movement outward, and consequent displacement, by the upwardly-projecting key, substantially as described.

6. The combination, in an improved car-axle box, of the box adapted to contain the axle-journal and its bearings, and a curved or partially-cylindrical cap fitted to the end of the box, and provided with a recess perforated at its bottom to receive the bolt which secures the lower end of the cap to the box, so that the head of said bolt, when in place, shall be within the line of the outer end of the box, to avoid collision of the bolt-head with other bodies and facilitate the attachment of the nut thereto, substantially as described.

SUMNER A. BEMIS.

Witnesses:
T. A. CURTIS,
CHAS. H. WOOD.